(12) United States Patent
Woods et al.

(10) Patent No.: US 8,308,876 B2
(45) Date of Patent: Nov. 13, 2012

(54) SYSTEM AND METHOD TO FORM AND HEAT-TREAT A METAL PART

(75) Inventors: Bryan David Woods, Andover, KS (US); Rahbar Nasserrafi, Andover, KS (US); Helen Ehlers, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 798 days.

(21) Appl. No.: 12/498,552

(22) Filed: Jul. 7, 2009

(65) Prior Publication Data

US 2011/0008530 A1    Jan. 13, 2011

(51) Int. Cl.
  *C21D 1/04*    (2006.01)
(52) U.S. Cl. .................. 148/518; 148/525; 148/526
(58) Field of Classification Search .................. None
  See application file for complete search history.

(56) References Cited

U.S. PATENT DOCUMENTS

| 6,265,310 B1 * | 7/2001 | Hoshino ................. 438/641 |
| 7,168,935 B1 * | 1/2007 | Taminger et al. ......... 425/174.4 |
| 7,286,893 B1 | 10/2007 | Mazumder |
| 2007/0242187 A1 * | 10/2007 | Yamaki et al. .............. 349/96 |

\* cited by examiner

*Primary Examiner* — George Wyszomierski
(74) *Attorney, Agent, or Firm* — Hovey Williams LLP

(57) ABSTRACT

A system and method for direct manufacturing and stress relieving a metal part without removing the metal part from a vacuumed chamber. The system may comprise the chamber, a wire feeder for depositing a metal wire onto a metal plate, an electron beam (EB) source for providing an electron beam to melt the metal wire during deposition, and a current-providing apparatus for joule heating the metal plate to provide heat treatment to the metal part. The method may comprise depositing the metal wire onto the metal plate within the vacuumed chamber, then providing intermediate stress relief after a portion of the metal wire is deposited onto the metal plate by applying an electrical current to the metal part. The electron beam may also be set at a temperature below a melting point of a particular metal of the metal part for relieving stress in the metal part.

14 Claims, 4 Drawing Sheets

SYSTEM AND METHOD TO FORM AND HEAT-TREAT A METAL PART

BACKGROUND

1. Field

The present invention relates to titanium and other metal parts. More particularly, the invention relates to a system and method for direct manufacturing of and providing stress relief to metal parts for aircrafts and other applications.

2. Related Art

Electron beam (EB) direct manufacturing is a process for making titanium parts and other metal parts for aircrafts and other applications. In EB direct manufacturing, a metal wire is deposited onto a metal plate and an electron beam bombards the wire as it is deposited onto the metal plate within a vacuumed chamber. The electron beam provides a focused heat to the metal wire for melting and deposition of the metal wire, bonding the metal wire to the metal plate and preceding metal wire layers. The electron beam transfers heat to the metal wire via conduction and/or radiation. Direct manufacturing is sometimes alternatively referred to as additive manufacturing, metal rapid prototyping, electron beam additive manufacturing, electron beam free form fabrication, or solid free form fabrication.

Because of the difference in temperatures of the metal plate and the metal wire heated by electron beam, stress may form within the metal part, such as warping, distortion, cracking, and other stresses introduced to the part during deposition of the metal wire. To relieve these intermediate stresses, the deposition process is stopped, the metal part is removed from the vacuumed chamber, and the metal part is sent off site to a qualified heat treat facility to stress relieve the metal part. Once the metal part receives stress relief treatment, it is shipped back to the manufacturer to be reinserted into the chamber, vacuumed again by the proper amount, and then again receives more layers of the metal wire.

Sometimes several rounds of deposition and subsequent heat treatment are required before completing the metal part. The shipping of the part and the use of separate heat treating equipment at a second facility adds to the overall time and cost of manufacturing the metal part using EB direct manufacturing.

SUMMARY

The present invention provides a system and method for direct manufacturing of a metal part, such as a titanium part, without removing the metal part from an airtight chamber for intermediate stress-relief. Specifically, the system and method may allow the metal part to be heat-treated at an intermediate point during the manufacturing process within the chamber by selectively applying stress-relieving joule heat to the metal part.

The system may comprise an airtight chamber placed under vacuum; a wire feeder for feeding metal wire onto a metal plate positioned within the chamber; an electron beam (EB) source providing a beam of electrons for melting the metal wire to deposit it onto the metal plate; and at least one current-providing apparatus attached to the metal plate to joule heat the metal plate. The system may also comprise clamps for fixing the metal plate within the airtight chamber. The metal part formed by this system comprises the metal plate and the metal wire deposited thereon.

The wire feeder and the EB source may deposit metal melted from the metal wire onto the metal plate to build up a particular metal part having desired shapes and dimensions. The EB source may be used during manufacture of the metal part to melt the metal wire, bonding it to the metal plate and/or preceding layers of the metal wire. The current-providing apparatus may comprise at least one bus bar and an electrical power unit and may provide electrical current to the metal plate while the wire feeder is not depositing metal wire onto the metal plate, thereby heat-treating the metal part. Additionally, the EB source may also be used to heat select portions of the metal part to a stress-relieving temperature below the melting point of that particular metal, thereby assisting the current-providing apparatus in providing even heat to the metal part.

A method of direct manufacturing and heat treating a metal part without removing the metal part from the chamber may comprise depositing metal wire onto a metal plate within a vacuumed chamber; directing an electron beam onto the wire as it is deposited onto the metal plate; and applying electric current to the metal plate after at least a portion of the metal wire is deposited onto the metal plate, to heat treat the metal part. The method may also comprise monitoring various stress indicators of the metal part during deposition of the metal wire and applying electric current to the metal plate when one or more of the stress indicators exceeds a given threshold of acceptable stress.

These and other important aspects of the present invention are described more fully in the detailed description below.

BRIEF DESCRIPTION OF THE DRAWINGS

Embodiments of the present invention are described in detail below with reference to the attached drawing figures, wherein.

Figure 1:
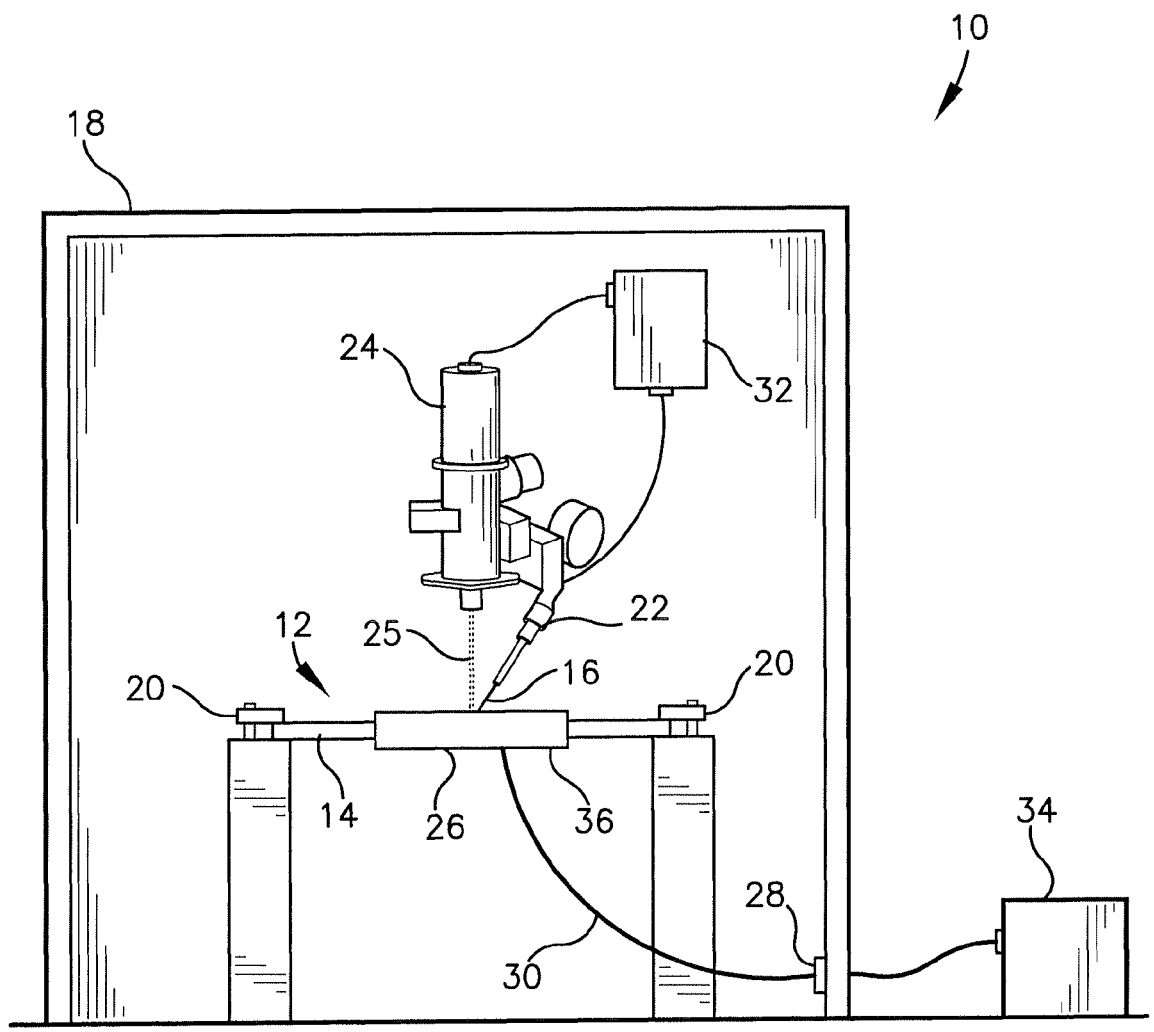
FIG. 1 is a schematic view of a system for forming and heat treating metal parts constructed in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

FIG. 1 illustrates a system 10 for forming and stress relieving a metal part 12 comprising a metal plate 14 and metal wire 16. The metal plate 14 and the metal wire 16 may be composed of the same type of metal, which may be any type of metal, such as titanium, titanium alloys such as Ti-6Al-4V, aluminum and nickel-based super alloys, or any other type of metal. The system 10 may comprise an airtight chamber 18; clamps 20 for fixing the metal plate 14 within the chamber 18; a wire feeder 22 for depositing the metal wire 16 onto the metal plate 14; an electron beam (EB) source 24 for heating the metal wire 16 during deposition; and a current-providing apparatus 26 for heating the metal plate 14 to provide stress relief to the metal part 12.

The airtight chamber 18 may be made of steel or other suitable materials and is configured to be vacuumed down to a desired temperature and atmospheric pressure. For example, the chamber 18 may be evacuated by mechanical and/or diffusion pumps and/or turbo-molecular pumps. In various embodiments of the invention, the chamber may run at approximately 10E-5 to 10E-6 torr. The airtight chamber may also comprise at least one feed through port 28 through which at least one electrical wire 30 may extend, as later discussed herein.

The clamps 20 may be any structure within the chamber 18 for fixing the metal plate 14 at a desired location within the chamber 18. For example, the clamps 18 may be bolts, c-clamps, hand-screw clamps, etc. Furthermore, at least part of one of the clamps 18 may be fixedly attached to an inner portion of the chamber 18. In various embodiments of the invention, the clamps 20 may comprise or be attached to structure operable to raise and lower the position of the clamps 20 and the metal plate 14 relative to the chamber 18, either electrically or mechanically.

In some embodiments of the invention, the clamps may include some type of electrical insulation (now shown) such as ceramic boards or appropriate coatings to prevent electrical leakage from the metal plate 14 to metal of the clamps 20 during joule heating of the metal plate 14. Electrical switching may also be used to allow grounding of the metal plate 14 during deposition of an electron beam 25 and to insulate the metal plate 14 electrically from the clamps 20 during joule heating of the metal plate 14. Such electrical switching may be controlled via programmable controls and/or by control unit 32, described below.

Figure 2:
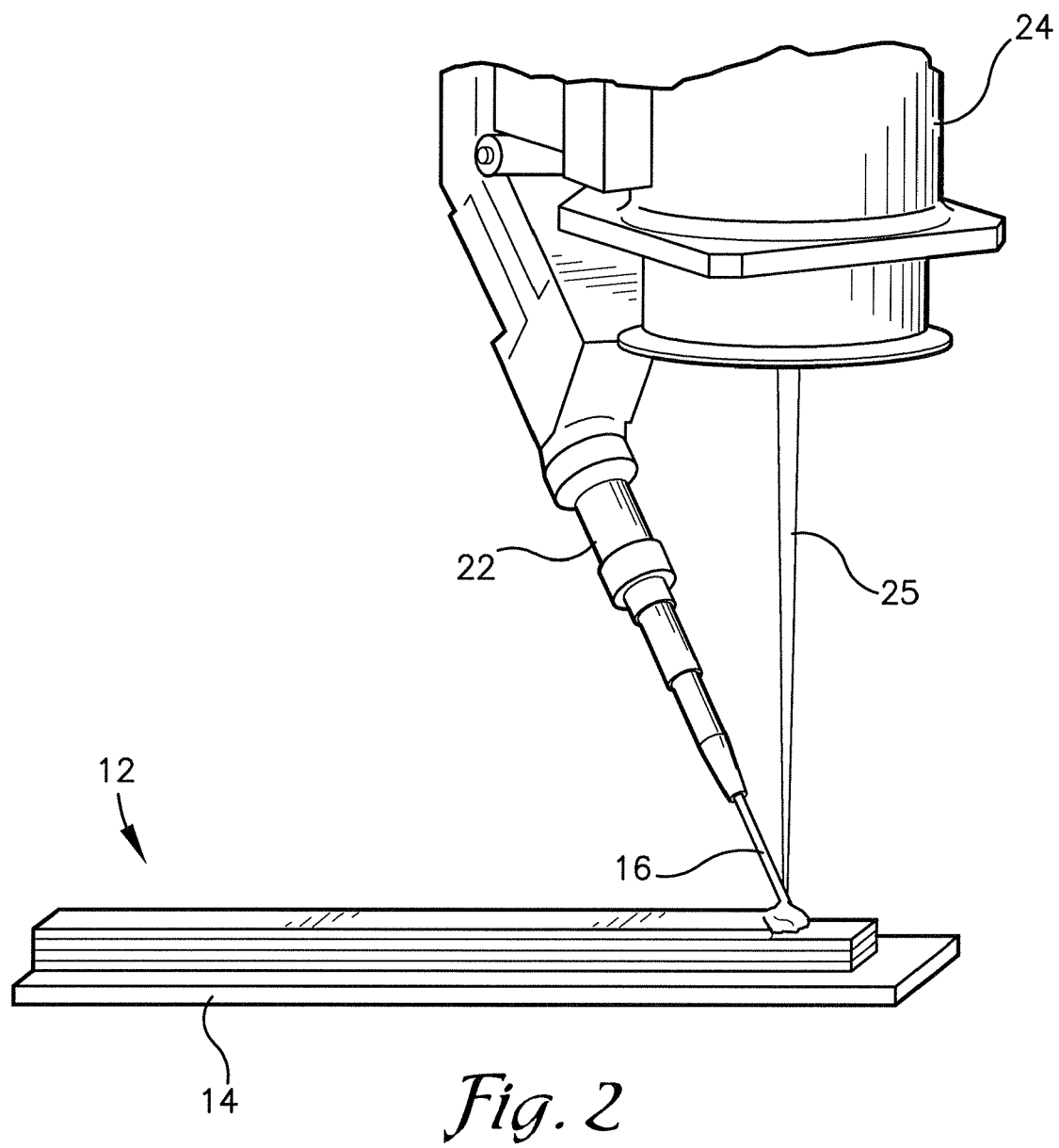
FIG. 2 is a fragmentary perspective view of an electron beam (EB) source and a wire feeder of the system of FIG. 1.

The wire feeder 22, illustrated in FIGS. 1-2, may be any apparatus operable to feed or dispense the metal wire 16 onto the metal plate 14. The wire feeder 22 may also be operable to move in a plurality of directions along a plurality of axes in order to place a desired amount of the metal wire 16 in various desired locations along the metal plate 14. For example, the wire feeder 22 may comprise or be communicably coupled with the control unit 32, as described herein, which may be configured or programmed to direct the motion as well as the speed of the wire feeder 22 and the amount of metal wire 16 dispensed.

The EB source 24, illustrated in FIGS. 1-2, may be an EB head configured to direct the beam 25 or a stream of electrons onto a concentrated area of the metal wire 16 and/or the metal plate 14. The EB source 24 may be operable to move in a plurality of directions along a plurality of axes and may also be communicably and/or electrically coupled to the control unit 32 and/or a separate control unit (not shown) for directing the motion of the EB source 24 and controlling the power and focus of the electron beam 25. In various embodiments of the invention, the EB source 24 and the wire feeder 22 may be integral with each other and move in a coordinated manner such that the electron beam 25 is continuously directed toward the metal wire 16 as it is deposited onto the metal plate 14.

The control unit 32 may comprise any combination of processors, controllers, integrated circuits, programmable logic devices, or other computing devices and resident or external memory for storing data, software, and other information, such as information related to the status and position of the wire feeder 22. The control unit 32 may be coupled with the wire feeder 22, the EB source 24, and/or other components of the system 10 through wired or wireless connections to enable information to be exchanged between the various components. The control unit 32 may be located inside of the chamber 18 or outside of the chamber 18. In one embodiment of the invention, the control unit 32 may send power and/or commands via a wire (not shown) through one of the feed through ports 28 to the wire feeder 22 and/or the EB source 24. Alternatively, the control unit 32 may wirelessly communicate with the wire feeder 22 and/or the EB source 24 via wireless transmitters and receivers.

The control unit 32 may implement a computer program and/or code segments to perform some of the functions described herein. The computer program may comprise an ordered listing of executable instructions for implementing logical functions in the control unit 32 such as some of the steps illustrated in FIG. 4 and described below. The computer program can be embodied in any computer-readable medium for use by or in connection with an instruction execution system, apparatus, or device, and execute the instructions. In the context of this application, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, device or propagation medium. More specific, although not inclusive, examples of the computer-readable medium would include the following: an electrical connection having one or more wires, a portable computer diskette, a random access memory (RAM), a read-only memory (ROM), an erasable, programmable, read only memory (EPROM or Flash memory), an optical fiber, and a portable compact disk read-only memory (CDROM).

The current-providing apparatus 26 may comprise an electrical power unit 34, and at least one electrical attachment 36, such as a bus bar, for providing electrical current from the electrical power unit 34. The electrical wire 30 may extend from the electrical power unit 34 outside of the chamber 18, through the feed through port 28, and to the electrical attachments 36. Alternatively, the electrical attachments 36 may be provided electrical current via the control unit 32 or by any other means known in the art.

Figure 3:
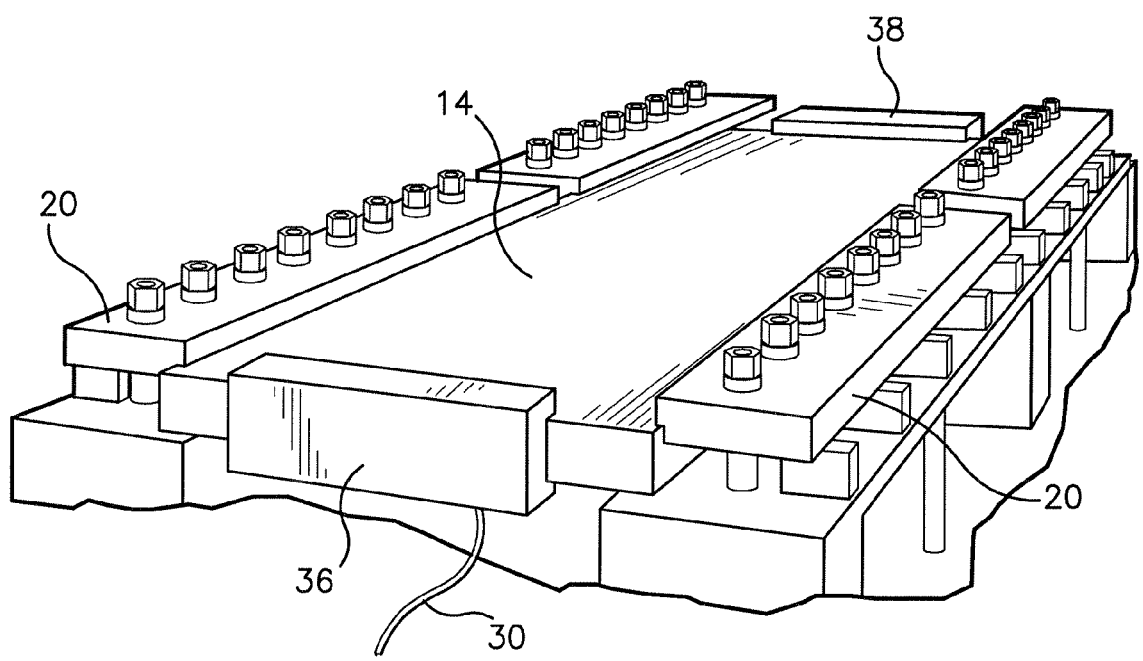
FIG. 3 is a perspective view of electrical attachments connected to a metal plate of the metal part of FIG. 1.

The current-providing apparatus 26 may be clamped or otherwise attached to any part of the metal plate 14. For example, the current-providing apparatus 26 may have a first electrical attachment 36 and a second electrical attachment 38, as illustrated in FIG. 3. The first electrical attachment 36 may be attached at one edge of the metal plate 14 and the second electrical attachment 38 may be attached at an opposing edge of the metal plate 14. The current-providing apparatus 26 is specifically configured to provide Joule heating or resistance heating to the metal part 12.

Finally, the system 10 may additionally comprise various measurement devices (not shown) for monitoring the temperature of the metal part 12 and other characteristics of the metal part 12 during its manufacture. For example, infrared thermometers may monitor the temperature of various areas of the metal part 12 to determine if the electric current is not evenly heating the metal part 12.

Figure 4:
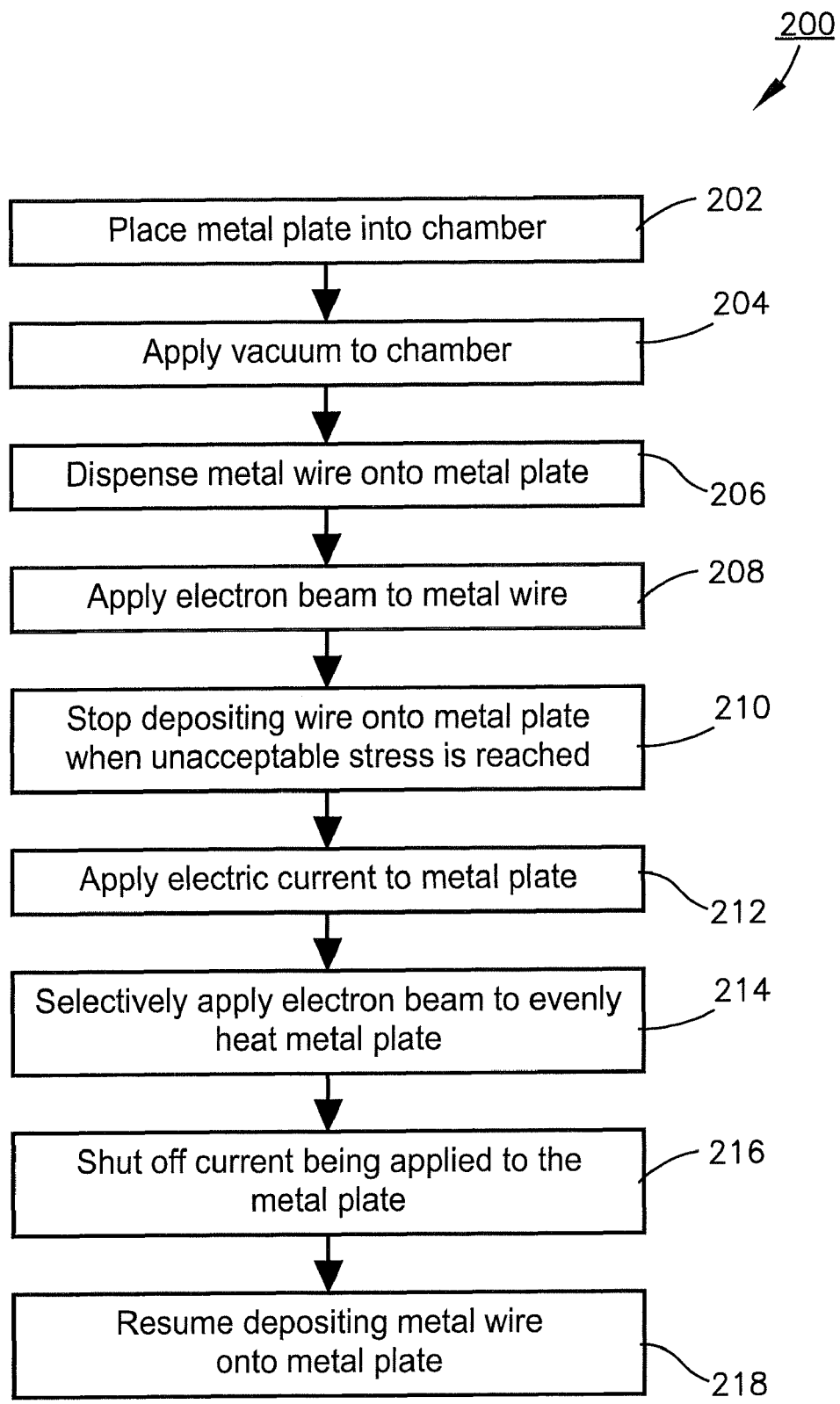
FIG. 4 is a flow chart of a method of forming and heat treating a metal part in accordance with an embodiment of the present invention.

A method 200 of using the system 10 to form and stress-relieve the metal part 12 via a direct manufacturing process is illustrated in FIG. 4. First, the metal plate 14 may be placed into the chamber 18 and may be attached via the clamps 20, as depicted in step 202. Then the chamber 18 may be sealed and vacuumed down to a desired temperature and/or atmospheric pressure, as depicted in step 204. The vacuumed chamber 18 allows the metal part 12 to be formed and heat-treated while avoiding contamination with interstitial elements.

Next, as depicted in step 206, the metal wire 16 is dispensed onto the metal plate 14. As described above, the wire feeder 22 may feed the wire 16 while the EB source 24 bombards the wire with the electron beam 25, as depicted in step 208. The electron beam 25 provides the energy for melting and depositing the metal wire 16, and heat is transferred via conduction and radiation. The wire 16 may be added or deposited to the metal plate 14 one pass at a time and one layer at a time along an axis of the part 12 to build up the part 12 to have a desired shape and desired dimensions. The electron beam 25 may provide a very focused, intense heat, which may cause the metal wire 16 to convert to a molten state, such that the molten metal is added to the metal plate 14 and may fuse onto the plate 16 or previous layers of the deposited wire 14.

The high temperatures introduced by the electron beam 25 and/or differences between the temperature of the deposited metal wire 16 and the metal plate 14 and/or the preceding layers of the metal wire 16 may introduce stress and strain into the part 12. When stress or strain is observed in the metal part 12, the depositing of the wire may be stopped, as depicted in step 210. For example, a variety of stress indicators may be measured or monitored, and if one or more of those stress indicators exceeds a threshold amount, the depositing of the wire may be temporarily halted. Then the current-providing apparatus 26 may apply an electrical current to the metal plate 14, as depicted in step 212. Alternatively, in some embodiments of the invention, the depositing of the wire 16 may continue while the electrical current is provided to the metal plate 14, or the electrical current may be provided to the metal plate 14 as the wire feeder 22 is repositioning to a starting point for depositing the wire 16 during a subsequent pass.

The electrical current provided to the metal plate 14 and the amount of time that the current is applied may correspond with an amount of stress relief desired and the amount of stress observed in the part 12. The amount of stress may be determined visual (such as observing a bowing of the part 12), or through trial and error of manufacturing multiple trials of the same part 12. Additionally, the amount of current and the amount of time used for stress relief of the part 12 may also depend on how the joule heating will heat the part 12. For example, finite element modeling (FEM) may be used to model the part 12 at various stages of manufacture to determine how the current will heat the part 12. If the joule heating will provide uneven heating, the electron beam 25 may be turned on to specified power and focus settings to heat certain areas of the part 12 that do not heat evenly, as depicted in step 214. For example, during this stress-relieving stage of the method 200, the electron beam 25 may be set to heat areas of the metal part 12 to a temperature lower than a melting point of a particular metal being used, but high enough to relieve a desired amount of stress.

In one embodiment of the invention, a temperature of approximately 1425 degrees F. may automatically relieve all residual stresses in the titanium alloy Ti-6Al-4V in under three minutes. Additionally, a temperature of approximately 1400 degrees F. may completely relieve all residual stresses generated in the titanium alloy Ti-6Al-4V by the direct manufactured process in about 5 minutes. However, full stress relief may not be required in many instances. Therefore, in various embodiments of the invention, applying electric current to the metal plate 14 may include applying enough electrical current to the metal plate 14 to increase the temperature of the metal part 12 to a temperature between approximately 1000 degrees F. to 1500 degrees F. for a predetermined length of time. For example, enough electrical current may be applied to raise the temperature of the part 12 to between approximately 1100 degrees F. to 1200 degrees F. In some embodiments of the invention, enough electrical current may be applied to raise the temperature of the part 12 and/or the plate 14 to approximately 30 percent to 50 percent of the melting temperature of that particular metal. However, other temperatures may be used as desired for specific stress relief requirements and specific types of metals.

Once the part 12 is heated for a desired amount of time at a desired temperature for a desired amount of stress relief, electrical current provided to the metal plate 14 may be turned off or disconnected, as depicted in step 216. Subsequently, the depositing of the metal wire 16 may resume, as depicted in step 218, unless the part 12 is complete. If additional stress relief is required during the manufacturing of the part 12, steps 210 through 214 may again be applied as needed to relieve the additional stress introduced into the part 12. Also, additional heat treating of various types may be performed following the completion of the part 12.

Applying joule heat or resistance heat to the part 12 during the manufacturing process allows the part 12 to remain in the vacuumed chamber 18 during the entire direct manufacturing process. Additionally, because the part 12 is heat treated within the chamber 18, the part 12 does not need to be removed from the chamber 18 and sent to an off-site facility for in-process or intermediate heat treating. This provides a significant time and cost savings.

Although the invention has been described with reference to the embodiments illustrated in the attached drawings, it is noted that equivalents may be employed and substitutions made herein without departing from the scope of the invention as recited in the claims.

Having thus described an embodiment of the invention, what is claimed as new and desired to be protected by Letters Patent includes the following:

The invention claimed is:

1. A method of direct manufacturing and heat treating a metal part, the method comprising:
  depositing metal wire onto a metal plate within a vacuumed chamber, wherein the metal plate and the metal wire deposited thereon together form the metal part;
  directing an electron beam onto the wire as it is deposited onto the metal plate; and
  applying electric current to the metal plate after at least a portion of the metal wire has been deposited onto the metal plate, to heat treat the metal part.

2. The method of claim 1, wherein applying electric current to the metal plate comprises passing electrical current through the metal plate during a time when the metal wire is not being deposited onto the metal plate.

3. The method of claim 1, further comprising applying the electron beam toward one or more sections of the metal plate, when the metal wire is not being applied to the metal plate, at a particular power and focus setting sufficient to heat the one or more sections to a stress-relieving temperature below a melting point of the metal plate.

4. The method of claim 1, further comprising vacuum pumping down the chamber to a proper temperature and atmospheric pressure for depositing metal wire onto a metal plate.

5. The method of claim 1, further comprising attaching bus bars to the metal plate, wherein the bus bars are configured to provide electrical current to the metal plate.

6. The method of claim 1, further comprising monitoring various stress indicators of the metal part during deposition of the metal wire and applying electric current to the metal plate when at least one of the stress indicators exceeds a given threshold of acceptable stress.

7. The method of claim 1, wherein applying electric current comprises applying enough electrical current to the metal plate to increase a temperature of the metal part to a Fahrenheit temperature between approximately 30 percent and 50 percent of a Fahrenheit melting temperature of the metal part for a predetermined length of time sufficient to provide a predetermined amount of stress relief.

8. The method of claim 1, wherein the metal part, metal wire, and metal plate are each comprised of at least one of titanium, titanium alloys, aluminum, and nickel-based super alloys.

9. A method of direct manufacturing and heat treating a metal part, the method comprising:
    placing a metal plate within an airtight chamber;
    applying vacuum to the airtight chamber;
    depositing metal wire onto a metal plate within the airtight chamber, wherein the metal plate and the metal wire deposited thereon together form the metal part;
    directing an electron beam onto the wire as it is deposited onto the metal plate;
    monitoring various stress indicators of the metal part during deposition of the metal wire onto the metal plate;
    determining when at least one of the stress indicators exceeds a given threshold of acceptable stress; and
    applying electrical current to the metal plate, thereby heating the metal part.

10. The method of claim 9, further comprising applying the electron beam toward one or more sections of the metal plate, when the metal wire is not being applied to the metal plate, at a particular power and focus setting sufficient to heat the one or more sections to a stress-relieving temperature below a melting point of the metal plate.

11. The method of claim 9, further comprising attaching bus bars to the metal plate, wherein the bus bars are configured to provide electrical current to the metal plate.

12. The method of claim 9, wherein the electrical current is applied to the metal plate after at least a portion of the metal wire has been deposited onto the metal plate and during a time when the metal wire is not being deposited onto the metal plate.

13. The method of claim 9, wherein applying electric current comprises applying enough electrical current to the metal plate to increase a temperature of the metal part to a Fahrenheit temperature between approximately 30 percent and 50 percent of a Fahrenheit melting temperature of the metal part for a predetermined length of time required to provide a predetermined amount of stress relief.

14. The method of claim 13, further comprising cutting off electrical current to the metal plate after the predetermined length of time and resuming depositing of the metal wire.

* * * * *